US005274699A

United States Patent [19]
Ranz

[11] Patent Number: 5,274,699
[45] Date of Patent: Dec. 28, 1993

[54] METHOD FOR PROVIDING CALLER IDENTIFICATION TO A CALL RECIPIENT

[75] Inventor: Stephen J. Ranz, Elmhurst, Ill.

[73] Assignee: Motorola, Inc., Schaumburg, Ill.

[21] Appl. No.: 919,517

[22] Filed: Jul. 24, 1992

[51] Int. Cl.⁵ ............ H04M 11/00; H04M 15/00; H04M 3/00
[52] U.S. Cl. ............... 379/142; 379/58; 379/62; 379/127; 379/245; 379/247
[58] Field of Search ........ 379/58, 61, 62, 63, 379/127, 142, 245, 247

[56] References Cited

U.S. PATENT DOCUMENTS

| | | | |
|---|---|---|---|
| 4,598,179 | 7/1986 | Clark et al. | 379/199 |
| 4,672,660 | 6/1987 | Curtin | 379/142 |
| 5,033,076 | 7/1991 | Jones et al. | 379/142 |
| 5,063,588 | 11/1991 | Patsiokas et al. | 379/142 |
| 5,121,423 | 6/1992 | Morihiro et al. | 379/245 |
| 5,134,645 | 7/1992 | Berken et al. | 379/58 |

*Primary Examiner*—Curtis Kuntz
*Assistant Examiner*—Vijay Shankar
*Attorney, Agent, or Firm*—John W. Hayes; Steven G. Parmelee

[57] ABSTRACT

An originator of a communication (110) selects from among a set of candidate displayable source indicators, which displayable source indicators can include both a unit ID and alias IDs, and then attempts to initiate a communication with a recipient communication unit (111). The attempt to initiate communication includes transmission of information, including the selected displayable source indicator. This allows a transmitting communication unit to most appropriately identify itself to a receiving communication unit.

23 Claims, 2 Drawing Sheets

5,274,699

METHOD FOR PROVIDING CALLER IDENTIFICATION TO A CALL RECIPIENT

FIELD OF THE INVENTION

This invention relates generally to communication systems and in particular to communication systems wherein information identifying a communication originator is available to a communication recipient, and is more particularly directed toward a method allowing the originator to select the identifying information.

BACKGROUND OF THE INVENTION

Many types of communication systems are known in the art, ranging from wireline telephone networks to cellular systems and sophisticated satellite communication arrangements. While communication systems are often employed merely for the convenience of individual users, there are many commercial and public service applications as well.

A recent development in landline telephony is the availability of a Caller ID (identification) feature. Caller ID automatically provides an indication to a call recipient of the telephone number of the calling party. This is useful for the subscriber who wishes to screen incoming calls, and also finds application in the tracing of crank or nuisance calls. Of course, the Caller ID feature can usually be disabled, at least for calls to individual users, but the disable option is usually overridden on calls to emergency services such as 911.

In the situation where a citizen calls an emergency number, seeking the assistance of a police or fire-fighting organization, the Caller ID feature has literally saved lives. Even if the caller is panicky or is cut off before he can provide his location to the emergency operator, Caller ID provides a display of the caller's telephone number that can easily be linked to a street address through access to an appropriate data base.

A feature similar to Caller ID is also useful in the commercial environment. A dispatcher who maintains communication with a group of users over an RF (radio frequency) communication system would find his task much simplified by the automatic transmission of an originator ID. Of course, in the commercial environment, involving fleets of trucks, taxicabs, etc., different drivers often operate the subject vehicles at different times, so the simple transmission of unit ID information would successfully identify the vehicle, but not the user. Communication system users are generally identified by separate identification labels called alias ID's. The term alias is used to distinguish these unique user identifications from the unit ID's that identify communication units themselves. Situations also exist where an individual may not wish to provide his user ID to a particular called party, and may be perfectly satisfied with the more anonymous unit ID only.

Accordingly, a need arises for an originator identification method that allows a caller to select from among a unit ID and various alias ID's to be transmitted to the call recipient.

SUMMARY OF THE INVENTION

This need and others are satisfied by the method of the present invention for providing identification information to a recipient. In a first communication unit, an option is provided to select from among a set of candidate displayable source indicators. At least one selected displayable source indicator is provided by selecting from among a set of candidate displayable source indicators. An attempt is then made to initiate a communication with a second communication unit, which attempt includes transmission of information including said at least one selected displayable source indicator.

DESCRIPTION OF A PREFERRED EMBODIMENT

Figure 1:
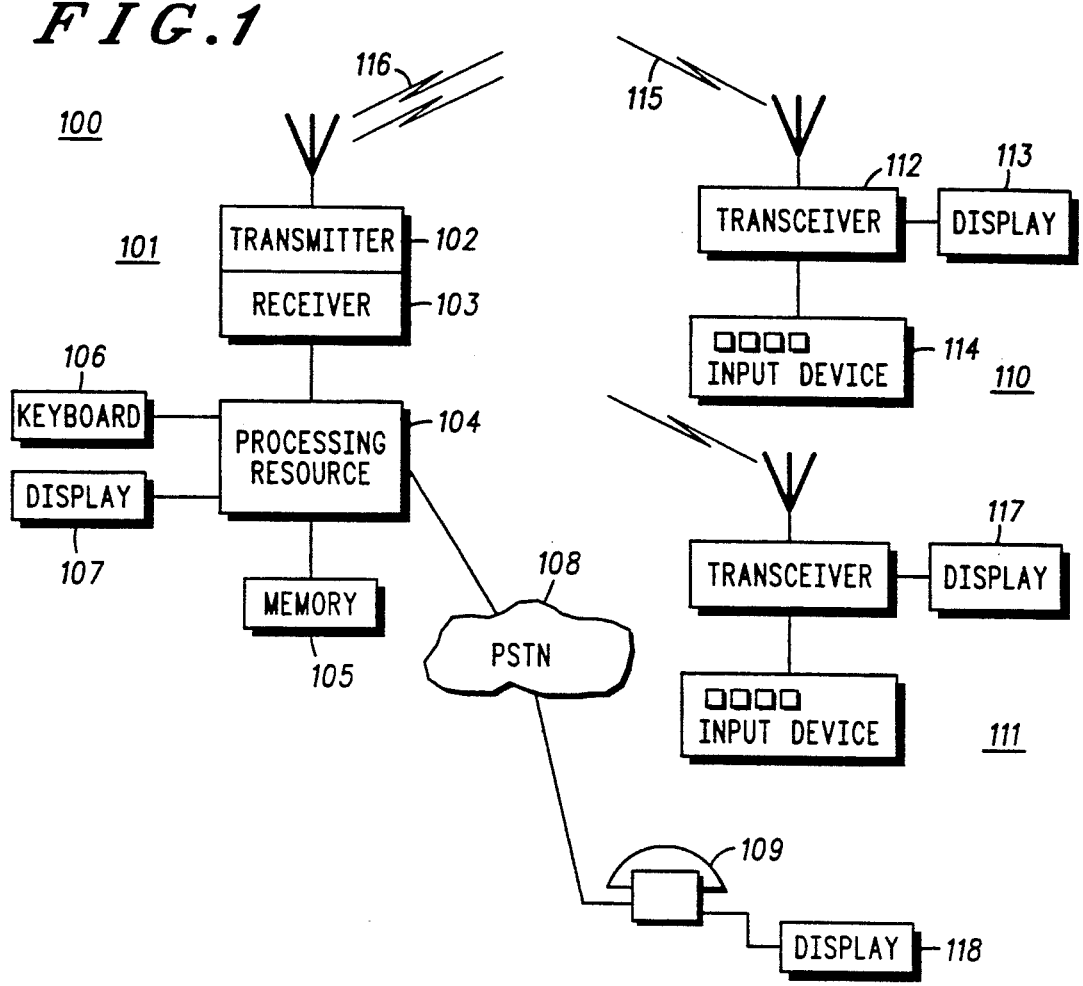
FIG. 1 is a block diagram depiction of a trunked communication system.

FIG. 1 illustrates a communication system, generally depicted by the number 100, in which the method of the present invention may be implemented. In the preferred embodiment, the communication system (100) is a trunked communication system with telephone interconnect, but the invention will function equally well in communication system of other types.

A trunked communication system is designed to encourage sharing of communication resources by a plurality of users. Communication resources may be RF frequencies, pairs of RF frequencies (in the case of full duplex communication), or time slots in a TDM (time-division multiplex) system. One or more trunked repeaters (101) form the nucleus of the system. A repeater, as is well-known in the art, is a type of communication unit that receives RF transmissions on one frequency, then retransmits received information signals on another frequency, usually at a higher power. Of course, each trunked repeater (101) requires a transmitter (102) and a receiver portion (103) to perform its function. The number of trunked repeaters connected to the system dictates the total number of communication resources that the system can make available to users.

Each trunked repeater is interconnected with a centralized processing resource (104), sometimes called a trunked central controller. The central controller (104) has an associated memory device (105), generally a hard disk system, to store a user data base. The central controller also includes a keyboard (106) for data entry and modification, and a display (107) so that the system manager can view data base information.

In order to provide the most complete service to users, most trunked systems also include telephone interconnect. In other words, the trunked central controller (104) is connected to the public switched telephone network (PSTN) (108) in order to provide communication with landline telephone units (109).

The trunked communication system (100) may include a large number of communication units (110, 111) within its service area, although only two are shown in the figure for the sake of clarity. The communication units (110, 111) generally include both portable units and mobile units.

As mentioned previously, the trunking central controller (104) has an associated memory (105) for the purpose of supporting an editable user data base. In a trunked system, individual unit ID's are stored in the data base for communication units that are permitted to operate on the system. Other information, such as communication group information for the individual units, is also stored in the data base, but the data base generally includes enough reserve capacity so that other information associated with each unit can also be accommodated.

An example of such additional information is alias identification information, commonly called alias ID's. An alias ID is an expression that usually identifies a user of a communication unit rather than the unit itself. The user's name, such as "Joe" or "Bob," is a common form of alias ID, and is termed a user alias, but the alias could be any grouping of letters, numbers, or symbols capable of being displayed by the communication units of users seeking to take advantage of this system enhancement. An alias ID need not always identify a user, but may instead be an alternate method of identifying a particular unit, perhaps a way known only to a few. Instead of unit number 5864 (a unit ID), a communication unit may be known as "Truck 22" (a unit alias), "Bob's Truck" (a unit alias or user alias), or "Bob" (a user alias). Such alias information can easily be entered into the data base in the memory device (105) associated with the central controller (104) via the keyboard (106) and viewed with the aid of the display (107). Of course, the alias information so entered can also be easily edited using the same process.

In order to implement the method described herein, an originating communication unit (110, for example), in addition to having the requisite transceiver section (112) for transmitting and receiving RF signals, must be equipped with an input device (114), such as a plurality of keys (or even a full ASCII keyboard), and a display device (113) for viewing unit ID and alias information. Since the unit ID and alias information are possible choices of displayable information that identify the source of a call, the information can be thought of as a set of candidate displayable source indicators.

Using the input device (114), the user is able to view the set of candidate displayable source indicators on the display (113), and make his selection of the particular indicator that he wishes to transmit. Of course, the user may elect to disable the feature entirely, so that no identification information is transmitted. After selecting the desired source indicator, the user then attempts to initiate a communication with a second communication unit with which the user wishes to exchange information. Often, this second communication unit will be a dispatcher, and the nature of the communication will center on location or schedule information. But the second communication unit may also correspond to another system user, perhaps a member of the same talk group or fleet.

In trunked communication systems, a user ordinarily just presses a push-to-talk (PTT) switch, generally located on a microphone (not shown in FIG. 1) associated with the communication unit. As is well-known in the trunking art, a signal called an inbound signalling word (ISW) is transmitted from the transceiver section (112) of the originating communication unit (110). This ISW contains a unit ID that uniquely identifies the communication unit (110) to the central controller (104). The ISW also includes information fields that identify the type of request (in this case, a request for a voice channel), identification of the unit with which communication is desired, information specifying the selected displayable source indicator, and information indicating whether the identification feature is to be enabled or disabled.

In response to this ISW; the central (104) accesses the data base stored in the memory (105) to check the ID transmitted by the requesting unit. Associated with the ID of the requesting unit in the data base is other information, including the set of candidate displayable source indicators. Using the information received from the requesting unit, the central controller (104) selects the appropriate displayable source indicator from among the set, and includes the displayable source indicator, in a form suitable for display at the recipient unit, in the outbound signalling word (OSW) directed at the recipient unit.

OSW's, like ISW's, contain unit ID's for units to which messages are directed. In the present example, the central controller (104) would cause appropriate OSW's (116) to be transmitted, using a selected trunked repeater (101), to both the originating communication unit (110), and the designated recipient communication unit (111, in this example). The OSW's assign the same voice channel to both communication units (110 and 111), so that conversation may commence, while including, in the OSW directed toward the recipient unit (111), the selected displayable source indicator in a format appropriate for viewing on the display (117) of the receiving communication unit (111).

Of course, the recipient communication unit could also be a landline telephone set (109) by virtue of the communication system's (100) interconnection with the PSTN (108), as discussed above. The PSTN, as is known, includes data input and storage capability that permits the association of specified ID information with a particular originating communication unit. A selected displayable source indicator can be transmitted to a recipient telephone set (109) for viewing on an associated display unit (118).

Figure 2:
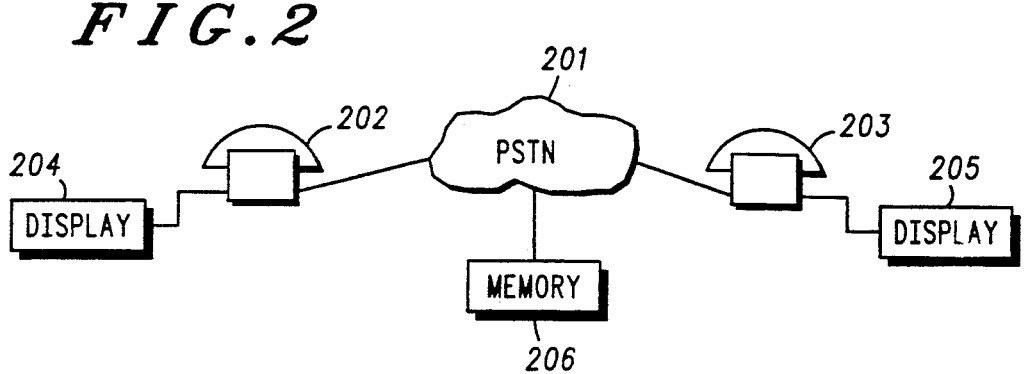
FIG. 2 illustrates standard landline telephone units interconnected with the public switched telephone network.

A landline telephone set could also be the originating unit. FIG. 2 shows landline telephone sets (202, 203) interconnected with the PSTN (201). As mentioned previously, the PSTN includes data entry and storage capability (206) sufficient to permit creation of sets of candidate displayable source indicators. Since all modern telephone sets are equipped with at least a rudimentary keypad (some, in fact, are quite extensive), an originator has the capability to select from among a set of candidate identifiers by using the keypad on his telephone (202) in conjunction with an associated display (204). The selected displayable source indicator would then be viewed on a display (205) associated with the recipient telephone (203).

Figure 3:
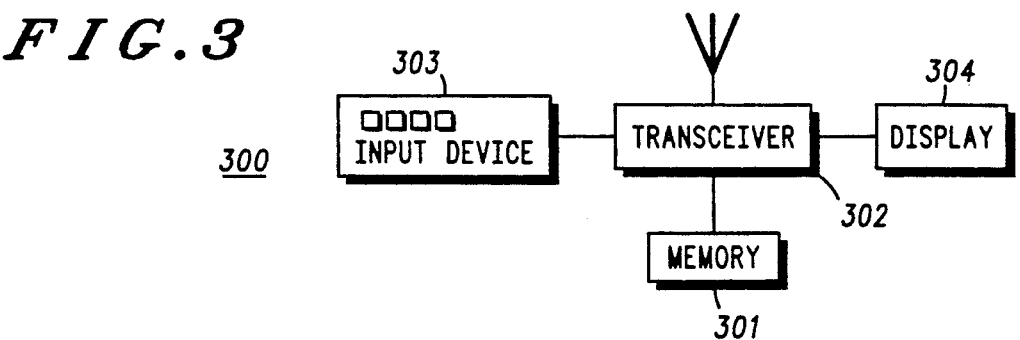
FIG. 3 shows an RF communication unit equipped with input device, display, and memory.

Although the communication system (100) of FIG. 1 includes adequate data base storage (105) to accommodate a large collection of unit ID's and associated alias ID's, it is also conceivable to store at least a part of the unit ID and alias ID information within a communication unit itself. FIG. 3 illustrates a communication unit, generally depicted by the numeral 300, that includes memory (301) in addition to a transceiver section (302), keys (303), and a display device (304). As indicated previously, since available information fields exist within ISW's and OSW's, there is little difficulty in transmitting a selected displayable source indicator in a format suitable for display, rather than just transmitting information that allows a central controller to locate the displayable information within its own data base. For that matter, storage of the set of displayable source indicators could be distributed, with a portion residing in the central controller's data base, and a portion residing within the memory (301) of an originating communication unit (300). In addition, since present trunked systems support at least some voice channel signalling, it is possible for information relating to the selected displayable source indicator, or even the selected displayable source indicator itself, in a format suitable for display, to be transmitted over the assigned voice channel.

Figure 4:
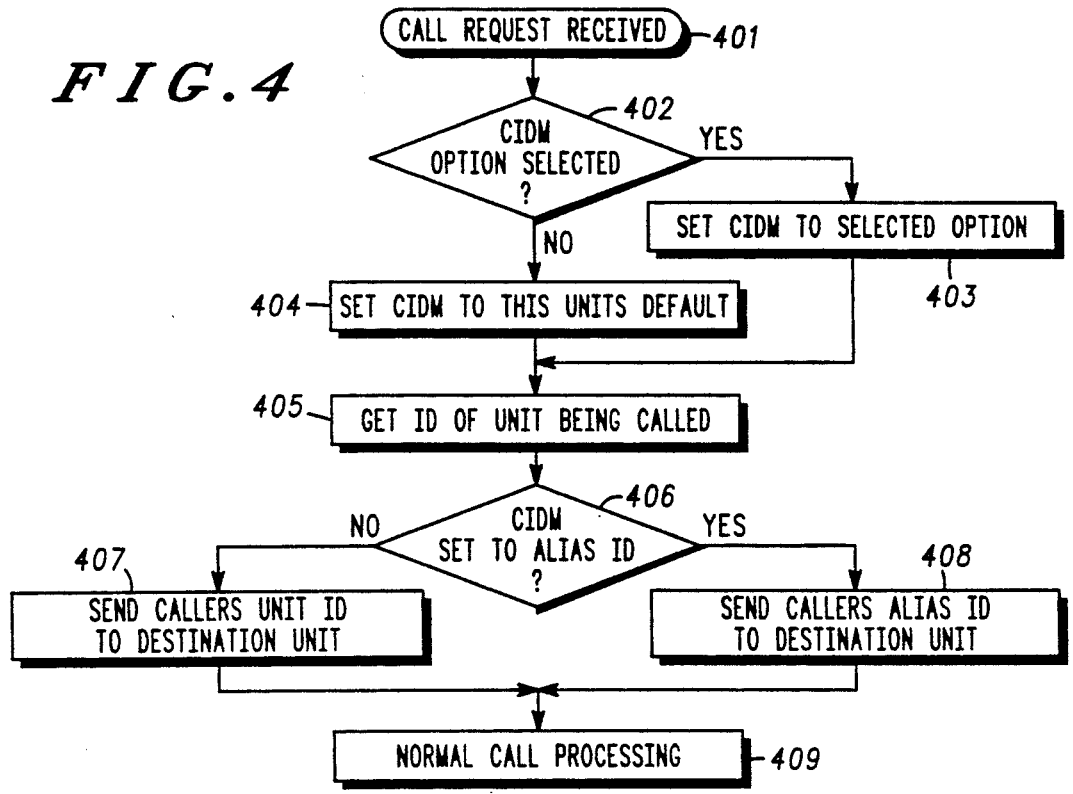
FIG. 4 is a flow diagram depicting identification mode activities at the central processing resource.

FIG. 4 is a flowchart of some of the processes that occur at a central controller during implementation of the method of the present invention. First (401), a call request is received from an originating unit in the form of an ISW that includes, as mentioned above, identification of the originating unit, identification of the recipient, information identifying the selected displayable source indicator, and an indication of whether the option to identify the originator is to be enabled or disabled.

In the next step (402), the central tests whether the caller identification mode (CIDM) feature is enabled by examining the appropriate information field in the received ISW. If the information field containing enable/disable information has been transmitted, the central sets the selected option (403). Of course, the data base associated with the central controller has room to accommodate considerable information for each communication unit registered on the system. One of these items of information is a default state for the caller identification option, which can be preprogrammed to either enable or disable the feature automatically. Thus, if no CIDM option is specified in the received ISW, the central sets the option mode to the unit's default value in block 404.

Next (405), the central accesses the data base to retrieve the unit ID of the recipient communication unit, then (block 406) tests to discover whether the unit ID or an alias ID has been chosen by the originating communication unit as the selected displayable source indicator. The central sends the unit ID as the selected displayable source indicator (407) if that is what the originating unit has selected. In the alternative, the central transmits the selected alias ID (408). In either event, normal call processing is then resumed (409).

Figure 5:
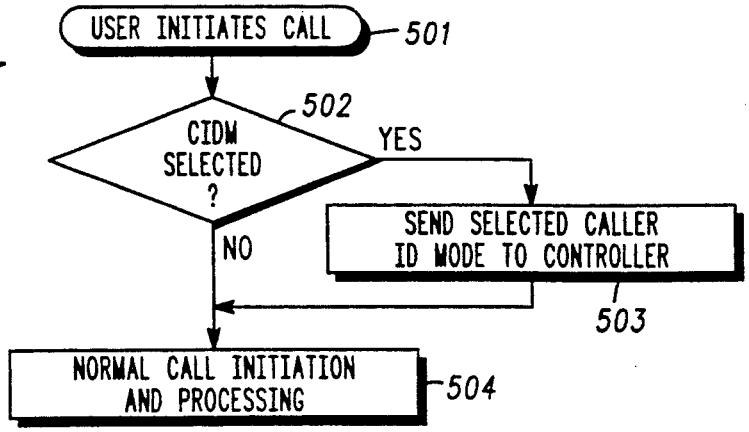
FIG. 5 is a flow diagram of a portion of the identification process at a communication unit.

FIG. 5 illustrates a portion of applicable tasks that occur in the originating communication unit. When the user attempts to originate a call (block 501), the unit checks to determine whether the caller ID mode has been selected (502) through the appropriate key associated with the communication unit. If so (503), the selected mode (enabled or disabled) is transmitted in the appropriate field of the ISW as the unit attempts to initiate communication with a recipient unit. If no specific mode selection is made by the user, the unit proceeds with normal call processing (504).

Through use of the method described above, communication system users have the flexibility to chose from among a set of possible identifiers, thus helping to make communication more efficient while adding a desirable feature.

What is claimed is:

1. A method for providing identification information to a recipient, the method comprising the steps of:
   in a first communication unit:
   (a) providing an option to select from among a set of candidate displayable source indicators;
   (b) selecting from among the set of candidate displayable source indicators to provide at least one selected displayable source indicator;
   (c) attempting to initiate a communication with a second communication unit, which attempt includes transmission of information including said at least one selected displayable source indicator.

2. The method in accordance with claim 1, wherein the first communication unit includes input means for allowing a user to input operating information, and the step (b) of selecting from among the set of candidate displayable source indicators includes the step of receiving selection information from the input means.

3. The method in accordance with claim 1, wherein the first communication unit is a wireless communication unit.

4. The method in accordance with claim 3, wherein the transmission of information is an RF transmission.

5. The method in accordance with claim 1, wherein the first communication unit is a wireline communication unit.

6. The method in accordance with claim 1, wherein the set of candidate displayable source indicators is stored remotely from the first communication unit.

7. The method in accordance with claim 1, wherein the set of candidate displayable source indicators is stored locally, within the first communication unit.

8. The method in accordance with claim 1, wherein at least a portion of the set of candidate displayable source indicators is stored remotely from the first communication unit, and at least a portion of the set of candidate displayable source indicators is stored locally, within the first communication unit.

9. A method for providing identification information to a recipient, the method comprising the steps of:
   in a first communication unit:
   (a) providing a set of candidate displayable source indicators;
   (b) providing an option to select from among the set of candidate displayable source indicators;
   (c) selecting from among the set of candidate displayable source indicators to provide at least one selected displayable source indicator;
   (d) attempting to initiate a communication with a second communication unit, which attempt includes transmission of information including said at least one selected displayable source indicator.

10. The method in accordance with claim 9, wherein the first communication unit is a wireless communication unit.

11. The method in accordance with claim 10, wherein the transmission of information is an RF transmission.

12. The method in accordance with claim 9, wherein the first communication unit is a wireline communication unit.

13. A method for providing identification information to a recipient, the method comprising the steps of:
   in a communication network:
   (a) providing a set of candidate displayable source indicators;
   in a first communication unit:
   (b) providing an option to select from among a set of candidate displayable source indicators;
   (c) selecting from among the set of candidate displayable source indicators to provide at least one selected displayable source indicator;
   (d) attempting to initiate a communication with a second communication unit, which attempt includes transmission of information including said at least one selected displayable source indicator;

in the communication network:

(e) receiving the transmission of information;

(f) using the information to select from among the set of candidate displayable source indicators to retrieve said at least one selected displayable source indicator;

(g) transmitting a message to the second communication unit which includes information in a form appropriate to allow display of said at least one selected displayable source indicator.

14. The method in accordance with claim 13, wherein the set of displayable source indicators includes a unit ID and at least one alias ID.

15. The method in accordance with claim 14, wherein at least one alias ID is a unit alias.

16. The method in accordance with claim 14, wherein at least one alias ID is a user alias.

17. The method in accordance with claim 14, wherein said at least one alias ID includes both a user alias and a unit alias.

18. The method in accordance with claim 13, wherein the first communication unit includes input means for allowing a user to input operating information, and the step (c) of selecting from among the set of candidate displayable source indicators includes the step of receiving selection information from the input means.

19. The method in accordance with claim 13, wherein the first communication unit is a wireless communication unit.

20. The method in accordance with claim 19, wherein the transmission of information is an RF transmission.

21. The method in accordance with claim 13, wherein the first communication unit is a wireline communication unit.

22. In an RF communication system, a method for providing identification information to a recipient, the method comprising the steps of:

in a first RF communication unit having keys for inputting information and a display for viewing information:

(a) providing an option to select from among a set of candidate displayable source indicators, which source indicators include a unit ID and at least one alias ID;

(b) using the keys to select from among the set of candidate displayable source indicators to provide at least one selected displayable source indicator, which selected source indicator is viewable on the display;

(c) attempting to initiate a communication with a second RF communication unit by requesting a voice channel assignment, wherein requesting a voice channel assignment includes transmission of said at least one selected displayable source indicator.

23. A method for providing identification information to a recipient, the method comprising the steps of:

in an RF communication system:

(a) providing a set of candidate displayable source indicators, which source indicators include a unit ID and at least one alias ID;

in a first RF communication unit having keys for inputting information and a display for viewing information:

(b) providing an option to select from among the set of candidate displayable source indicators;

(c) using the keys to select from among the set of candidate displayable source indicators to provide at least one selected displayable source indicator, which selected source indicator is viewable on the display;

(d) attempting to initiate a communication with a second RF communication unit by requesting a voice channel assignment, which request includes transmission of information including said at least one selected displayable source indicator;

in the RF communication system:

(e) receiving the transmission of information;

(f) using the information to select from among the set of candidate displayable source indicators to retrieve said at least one selected displayable source indicator;

(g) transmitting a voice channel assignment to the second RF communication unit which includes information in a form appropriate to allow display of said at least one selected displayable source indicator.

* * * * *